Jan. 1, 1946. W. S. BOWEN 2,391,863
DUST COLLECTING AND TREATING MECHANISM
Filed Sept. 20, 1943 2 Sheets-Sheet 2
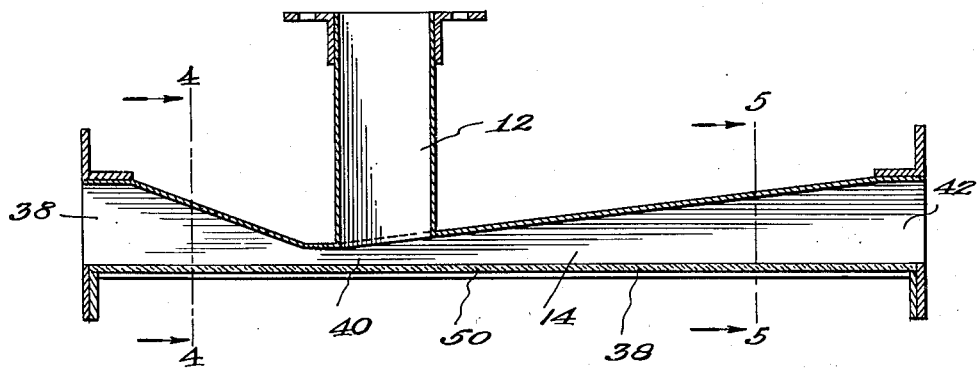
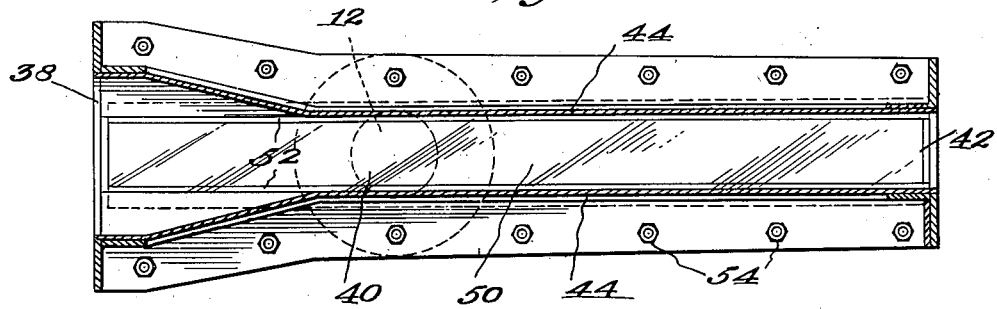
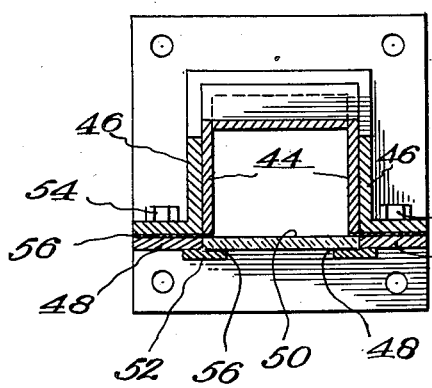
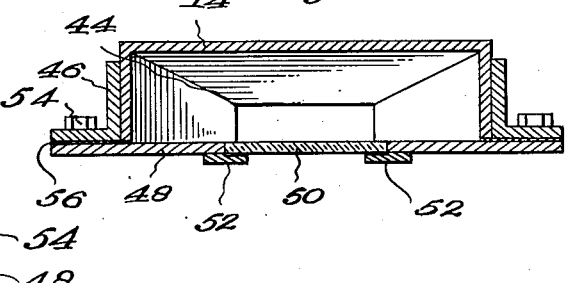
INVENTOR.
WILLIAM SPENCER BOWEN
BY
Hoguet, Neary & Campbell
ATTORNEYS Patented Jan. 1, 1946

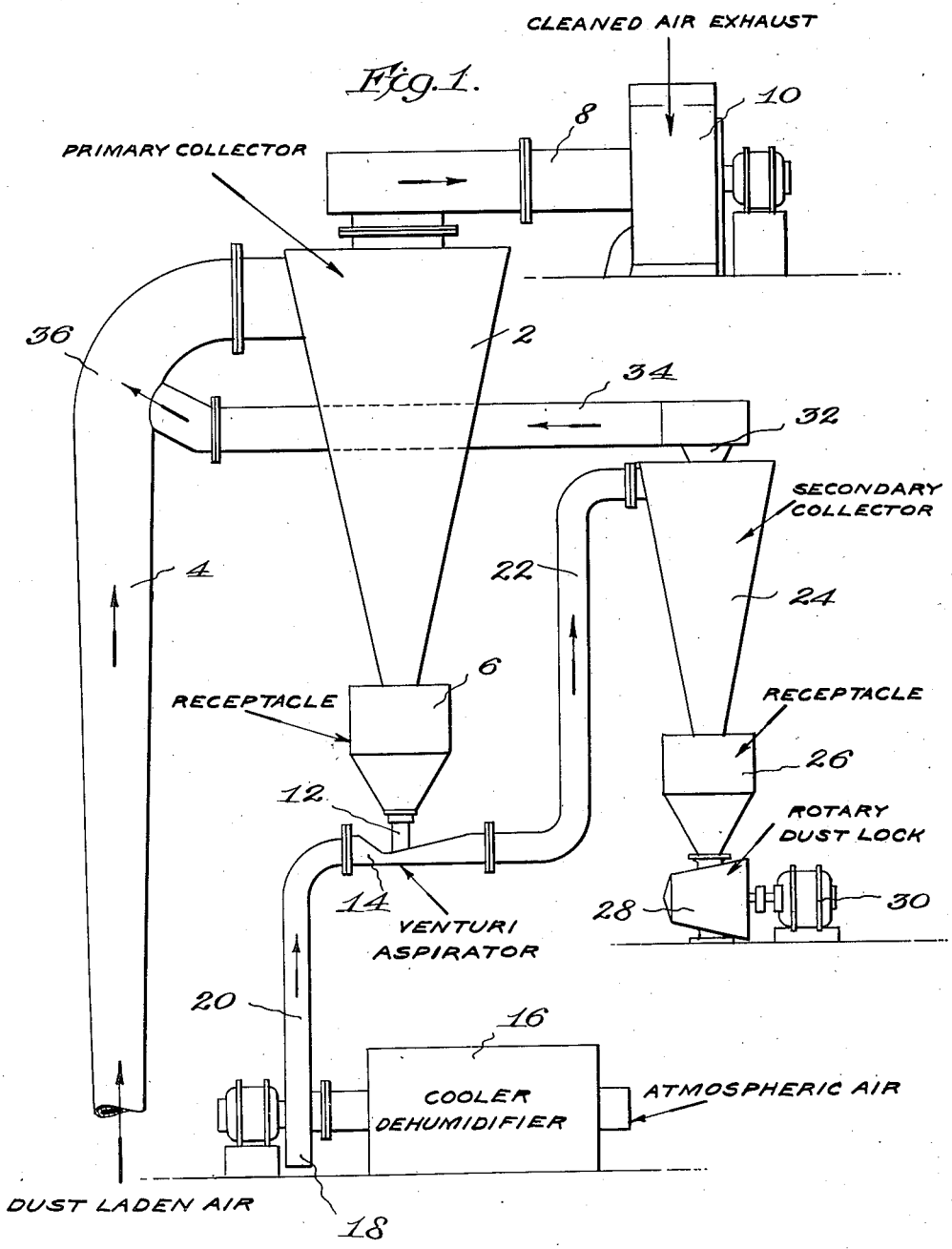

2,391,863

UNITED STATES PATENT OFFICE 2,391,863

DUST COLLECTING AND TREATING MECHANISM

William Spencer Bowen, Westfield, N. J.

Application September 20, 1943, Serial No. 503,083

2 Claims. (Cl. 183—5)

This invention relates to methods and mechanism for treating air or other gases to remove dust and suspended matter therefrom and to condition the gases for reuse.

Dust separating systems of the prior art have frequently employed centrifugal separators, but they are often inadequate and inefficient because of the tendency of the separated matter to arch or accumulate in the separator near the center thereof. When this occurs the action of the separator is impaired and gases leaving the separator frequently carry entrained particles of dust therewith. Moreover, prior systems have failed in most instances to control the moisture content and temperature of the gases undergoing treatment whereas these conditions appear to have a marked influence upon the operation of such systems.

In accordance with the present invention, the separation of dust from gases is carried out in a manner to prevent the arching or accumulation thereof in the separator and the gases being treated may be conditioned with respect to their temperature and moisture content so as to increase the separation of dust therefrom.

Novel apparatus and combinations of elements are employed for this purpose whereby the efficiency of the system is materially increased. The design and construction of such apparatus may be varied but in general it embodies two dust separators. The first or primary dust separator is of a centrifugal type and receives the dust-laden air or gases to be treated while supplemental air is supplied to the second separator through a passage having a venturi therein, the throat of which communicates with the dust outlet from the primary separator. The dust collecting in the primary separator is thus effectively removed therefrom and carried to the second separator. In the second separator the dust is removed from the supplemental air and the clean supplemental air is returned and mixed with the dust-laden air passing to the primary separator. By cooling and drying the supplemental air and mixing it with the dust-laden air passing to the first separator all of the air being treated may be conditioned to insure the most effective separation of dust or suspended matter therefrom. Moreover, the removal of dust from the primary separator is effected in a manner to preclude any arching or building up of dust therein so that the air or gases passing therefrom for reuse are thoroughly cleaned, cooled and dried.

Another feature of the invention resides in the provision of means whereby the operation of the primary dust separator may be readily observed and checked and cleaning and repair of the separator is facilitated.

The principal objects of the present invention are to provide improved methods and means for the removal of dust or other suspended matter from air or gases.

Another object of the invention is to provide novel means for preventing the accumulation of dust in a dust separator.

A particular object of the invention is to provide a novel system for removing dust from gases wherein primary and secondary dust separators are utilized in combination to afford substantially complete removal of dust from gases.

A further object of the invention is to provide improved means for cleaning and conditioning air for reuse.

Another object of the invention is to provide dust separating mechanism with means which permit ready observation of the operations and cleaning of the apparatus.

These and other objects and features of the invention will appear from the following description thereof in which reference is made to the figures of the accompanying drawings.

In the drawings:

Fig. 1 is a diagrammatic view in elevation of a preferred form of apparatus for cleaning gases in accordance with the present invention;

Fig. 2 is a vertical sectional view through a preferred form of Venturi construction embodied in the apparatus of Fig. 1;

Fig. 3 is a longitudinal sectional view through the Venturi construction illustrated in Fig. 2;

Figs. 4 and 5 are vertical sectional views taken on the lines 4—4 and 5—5 respectively of Fig. 2 the outlet 12 and the flanges on outlet 42 being omitted in the interest of clarity.

In that form of the invention chosen for illustration in the figures of the drawings a primary separator 2 which is of a centrifugal type receives dust-laden air through the conduit 4 which enters the upper portion of the separator 2 tangentially thereto. The air rotating in the separator is cleaned and the dust separated from the air passes downward therein to the receptacle 6 whereas the cleaned air passes from the top of the separator 2 through conduit 8 to an exhaust fan 10.

The lower portion of the dust receptacle 6 is provided with an outlet 12 which communicates with the throat of a Venturi member 14. Supplemental air to be used in the operation is forced through a cooling dehumidifying device 16 by a motor driven blower 18 and is passed through the conduit 20 to the venturi 14. The supplemental air in flowing through the venturi 14 increases in velocity but decreases in pressure creating a suction effect in the dust outlet 12 of the primary separator 2. The supplemental air thus draws off dust accumulating in the receptacle 6 and carries it through the conduit 22 to the second dust separator 24. The latter separator may also be of a centrifugal type and the supplemental air passed thereto is conditioned to assure the most effective separation of dust therefrom. The dust removed from the air in the primary separator and carried to the secondary separator is separated therefrom and passes to dust receptacle 26 and the dust lock 28 actuated by motor 30.

Cleaned and conditioned air from the secondary dust separator 24 is passed through outlet 32 and conduit 34 and is mixed with the dust-laden air at 36 as it passes through the conduit 4 to the primary dust separator 2. In this way the dust-laden air to be treated is mixed with the cleaned and conditioned supplemental air prior to its entry into the primary separator 2 so that the temperature and humidity of the air being treated in the primary separator are also favorable to the elimination of suspended matter from the air. Moreover, the accumulation of dust in the first separator and the danger of inefficient operation thereof because of such accumulation is avoided by the action of the venturi 14.

The venturi 14 through which the supplemental air is passed may be of any suitable type. However, as illustrated in detail in Figs. 2 to 5 the venturi prefereably is provided with an air inlet 38, a throat 40 and an outlet 42. The dust outlet 12 from the dust receptacle 6 of the primary separator connects with the throat 40 of the venturi as shown in Fig. 2 so that an aspirating effect is produced to draw off the dust from the primary separator and receptacle 6.

The Venturi member 14 is provided with sidewalls 44 to which are secured flange forming elements 46 having supporting plates 48 removably secured thereto. The inner edges of these plates are spaced apart and a plate of glass or other transparent material 50 is interposed therebetween and held in place by the retaining strips 52. In this way a sight opening is provided through which the operations of the venturi and primary separator may be observed for inspection and control of the operation. Moreover, by unscrewing the bolts 54 the supporting plates 48 and the sight glass 50 can be removed to provide access to the dust outlet 12, receptacle 6, and primary separator 2 for cleaning or repair of the apparatus. Suitable packing 56 is provided between the flange forming elements 46 and supporting plate 48 and between the sight glass 50 and the retaining strips 52 to provide an airtight construction.

The action of the venturi in continually drawing off the dust as it is removed from the air in the separator 2 and the action of the second separator 24 in removing such dust from the cooled and dehumidified supplemental air serves to insure the preservation of optimum temperature and humidity conditions in the mixed dust-laden and supplemental air passing to the first separator 2. In this way the cleaned air passing to the exhaust blower 10 from the separator 2 is effectively cleaned and conditioned for reuse.

The operation of the mechanism will be apparent from the foregoing description and drawings. The dust-laden air, passing to the primary separator 2 through the inlet conduit 4, is mixed with cleaned and conditioned air passing through conduit 32 from the secondary separator 24. The mixed air passes into the separator 2 where dust is separated therefrom and the cleaned and conditioned air then passes upward through the air outlet 8 to the exhaust blower 10.

The dust removed from the air in the primary separator passes to the receptacle 6 from which it is withdrawn through the dust outlet 12 by the action of the venturi 14. Supplemental air passing through the venturi 14 is supplied from the blower 18 after being cooled and dehumidified. In flowing through the venturi it exerts an aspirating effect upon the dust outlet 12 to draw off the dust from the first separator and prevent arching or accumulation of dust therein which might impair the operation of the primary separator. The dust thus removed from the primary separator is carried to the secondary separator where it is removed from the system through the dust lock 28, while the cleaned supplemental air is returned to the first separator by mixing with the dust-laden air entering through the air inlet 4.

In actual practice the system described gives a higher yield of dust than is obtained by the treatment of dust-laden air with a single separator thus indicating substantial improvement in the removal of dust and suspended matter from the air or gases being treated. At the same time the air is discharged in a clean, dry and cooled condition and may be used in systems wherein delicate or sensitive materials are undergoing treatment, as when working with special plastics or other products.

It will be apparent that the construction and arrangement of the various elements of the combination and the form of separators, venturi, blowers, air conditioning mechanism and the like may be altered considerably without departing from the spirit and scope of the invention. Therefore it should be understood that the embodiment of the invention shown in the drawings and particularly described is intended to be illustrative only and is not intended to limit the following claims.

I claim:

1. Apparatus for treating dust-laden gases comprising a primary dust separator having an air inlet, an air outlet, and a dust outlet, a supplemental air passage having a venturi therein to the throat of which said dust outlet is connected whereby dust is aspirated from said outlet by said venturi and a reduced pressure is created in the lower portion of the primary separator, a secondary dust separator receiving said supplemental air and the dust from said primary separator, means for mixing air from the air outlet of said secondary dust separator with air passing through the air inlet to the primary dust separator and means for reducing the humidity and temperature of the supplemental air mixed with the dust-laden air passing to the primary separator.

2. Apparatus for treating dust-laden gases comprising a primary dust separator having an air inlet, an air outlet, and a dust outlet, a supplemental air passage having a venturi therein to the throat of which said dust outlet is connected whereby dust is aspirated from said outlet by said venturi and a reduced pressure is created in the lower portion of the primary separator, a secondary dust separator receiving said supplemental air and the dust from said primary separator, means for mixing air from the air outlet of said secondary dust separator with the air passing through the air inlet to the primary dust separator and means for reducing the humidity and temperature of the supplemental air prior to its passage to the secondary separator.

WILLIAM SPENCER BOWEN.